United States Patent
Wang et al.

(10) Patent No.: US 11,286,199 B2
(45) Date of Patent: Mar. 29, 2022

(54) SUBSTANTIALLY TRANSPARENT SUBSTRATES INCLUDING HIGH AND LOW EMISSIVITY COATING LAYERS

(71) Applicants: AGC Automotive Americas R&D, Inc., Ypsilanti, MI (US); AGC Flat Glass North America, Inc., Alpharetta, GA (US)

(72) Inventors: Jiangping Wang, Novi, MI (US); Daniel Douglas Bennett, Tecumseh, MI (US); Timothy Edward Madison, Abingdon, VA (US)

(73) Assignees: AGC Automotive Americas Co., a division of AGC Flat Glass North America Inc., Alpharetta, GA (US); AGC Flat Glass North America, Inc., Alpharetta, GA (US)

(*) Notice: Subject to any disclaimer, the term of this patent is extended or adjusted under 35 U.S.C. 154(b) by 300 days.

(21) Appl. No.: 16/458,881

(22) Filed: Jul. 1, 2019

(65) Prior Publication Data

US 2021/0002165 A1    Jan. 7, 2021

(51) Int. Cl.
| | |
|---|---|
| *B32B 15/04* | (2006.01) |
| *B32B 17/06* | (2006.01) |
| *C03C 17/245* | (2006.01) |
| *B32B 17/10* | (2006.01) |
| *C03C 17/36* | (2006.01) |
| *B60J 1/02* | (2006.01) |
| *B60J 1/08* | (2006.01) |

(Continued)

(52) U.S. Cl.
CPC ...... *C03C 17/245* (2013.01); *B32B 17/10036* (2013.01); *B32B 17/10137* (2013.01);
(Continued)

(58) Field of Classification Search
CPC .................................................. C03C 17/366
(Continued)

(56) References Cited

U.S. PATENT DOCUMENTS 4,952,423 A * 8/1990 Hirata ..................... C03C 17/23
427/108
5,520,996 A * 5/1996 Balian ................ C03C 17/3435
428/216

(Continued)

FOREIGN PATENT DOCUMENTS

| JP | 2015221747 A | 12/2015 |
|---|---|---|
| WO | 03095383 A2 | 11/2003 |
| WO | 03095385 A1 | 11/2003 |

OTHER PUBLICATIONS

English language abstract for JP 2015-221747 extracted from espacenet.com database on Jul. 17, 2019, 2 pages.

(Continued)

*Primary Examiner* — Lauren R Colgan
(74) *Attorney, Agent, or Firm* — Howard & Howard Attorneys PLLC

(57) ABSTRACT

A treated substrate includes a low emissivity coating layer disposed on a substrate and a high emissivity coating layer disposed on the low emissivity coating layer. The low emissivity coating layer is formed a low emissivity coating composition including silver, or indium tin oxide, or fluorine-doped tin oxide, while the high emissivity coating layer is formed from a high emissivity coating composition including a carbon-doped silicon oxide. The treated substrate has an emissivity of from 0.7 to less than 1.0 at wavelengths ranging from 8 micrometers to 13 micrometers and has an emissivity of greater than 0 to 0.3 at wavelengths less than 6 micrometers. The treated substrate also maintains a visually acceptable mechanical brush durability resistance for at least 150 test cycles tested in accordance with ASTM D2486-17.

23 Claims, 5 Drawing Sheets

(51) Int. Cl.
*B60J 1/18* (2006.01)
*B60R 13/08* (2006.01)

(52) U.S. Cl.
CPC .. *B32B 17/10174* (2013.01); *B32B 17/10449* (2013.01); *B32B 17/10633* (2013.01); *B32B 17/10761* (2013.01); *C03C 17/366* (2013.01); *B32B 2255/20* (2013.01); *B32B 2307/42* (2013.01); *B60J 1/02* (2013.01); *B60J 1/08* (2013.01); *B60J 1/18* (2013.01); *B60R 13/0815* (2013.01); *C03C 2217/211* (2013.01); *C03C 2217/213* (2013.01); *C03C 2217/24* (2013.01); *C03C 2218/153* (2013.01); *C03C 2218/156* (2013.01)

(58) Field of Classification Search
USPC .................. 428/212, 426, 428, 432, 433
See application file for complete search history.

(56) References Cited

U.S. PATENT DOCUMENTS

| | | | |
|---|---|---|---|
| 6,040,939 | A | 3/2000 | Demiryont et al. |
| 6,114,043 | A * | 9/2000 | Joret ................... C03C 17/36 428/428 |
| 7,901,781 | B2 | 3/2011 | Maschwitz et al. |
| 9,067,822 | B2 | 6/2015 | Maschwitz et al. |
| 9,709,717 | B2 | 7/2017 | Hevesi et al. |
| 9,944,553 | B2 | 4/2018 | Mahieu et al. |
| 2006/0014027 | A1* | 1/2006 | Oudard ................... C03C 17/22 428/428 |
| 2008/0128071 | A1 | 6/2008 | Murphy |
| 2012/0251819 | A1* | 10/2012 | Buhay ................. C03C 17/3644 428/336 |
| 2015/0165965 | A1 | 6/2015 | Masaki et al. |
| 2016/0032639 | A1 | 2/2016 | Bouesnard et al. |

OTHER PUBLICATIONS

Chambers, John R., "Linearized Hollow Cathode Plasma for PECVD", 60th Annual Technical Conference Proceedings, Providence, Rhode Island, Apr. 29-May 4, 2017, 14 pages.

Raman, Aaswath P. et al., "Passive Radiative Cooling Below Ambient Air Temperature Under Direct Sunlight", Nature, vol. 515, 2014, pp. 540-544.

Zhai et al., "Scalable-Manufactured Randomized Glass-Polymer Hybrid Metamaterial for Daytime Radiative Cooling", Science, vol. 355, Mar. 10, 2017, pp. 1062-1066.

* cited by examiner

SUBSTANTIALLY TRANSPARENT SUBSTRATES INCLUDING HIGH AND LOW EMISSIVITY COATING LAYERS

BACKGROUND OF THE INVENTION

1. Field of the Invention

The invention generally relates to emissivity coating layers for substantially transparent substrates, and in particular for substantially transparent substrates including high and low emissivity coating layers disposed thereon for use as a passive radiation cooling system.

2. Description of Related Art

Transparent or substantially transparent substrates, such as those used in automotive or architectural glazing (or glass), are by nature highly thermally emissive. To improve thermal control (insulation and solar optical properties) of these untreated substrates, thin film coatings of low emissivity coating compositions can be applied to the surface of such substrates, typically by pyrolytic chemical vapor deposition or magnetron sputtering, to form treated substrates. When these treated substrates are installed within openings of structures having interior spaces located in proximity to such openings (such as the passenger compartment of a vehicle or the interior space of a building), the inclusion of the low emissivity coating layers functions to minimize heat buildup within the interior spaces of such structures by blocking (i.e., reflecting and/or absorbing) certain amounts of IR (infrared) radiation and optionally by also blocking certain amounts of ultraviolet (UV) radiation.

However, the low emissivity coating layers are typically soft coating layers (i.e., coating layers have relatively low hardness as measured on a Shore hardness scale) having limited durability. Accordingly, it is easy to damage such low emissivity coating layers during installation, or during subsequent use. Accordingly, some low emissivity coatings materials (such as Ag-based low emissivity coating materials) cannot be used due to potential direct exposure to end users. Alternatively, if such low emissivity coatings are used, their use in limited to use on interior-facing surfaces of substrates that are not susceptible to damage caused by the environment, or that are not easily susceptible to damage before, during, or after installation due to any number of potential causes.

To improve passive radiative cooling performance of untreated transparent or substantially transparent substrates, thin film coatings of high emissivity coating compositions can be applied to the surface of such substrates to form treated substrates. When these treated substrates are installed within openings of structures having interior spaces located in proximity to such openings as described above, the inclusion of the high emissivity coating layers functions to draw out any heat generated on the substrate due to light transmission through the substrate and away from the interior space. In addition to providing passive radiative cooling performance, such high emissivity coating layers are also generally harder and more durable (in terms of corrosion resistance and abrasion resistance) than low emissivity coating layers applied to such substrates, but do not provide the thermal control properties of low emissivity coating layers applied to such substrates as described above.

The subject invention seeks to address some of the deficiencies of the treated substrates having low emissivity layers or high emissivity layers disposed thereon as described above.

SUMMARY OF THE INVENTION AND ADVANTAGES

The subject invention relates to treated substrate comprising a low emissivity coating layer disposed on a substrate and a high emissivity coating layer disposed on the low emissivity layer such that said low emissivity coating layer is between said high emissivity coating layer and said substrate.

The low emissivity coating layer is formed from a low emissivity coating composition that is configured to block (i.e., reflect and/or absorb) certain amounts of IR (infrared) radiation and, in certain embodiments, is also configured to block certain amounts of ultraviolet (UV). The low emissivity coating layer is also configured to allow a vast majority of the transmission of radiation in the visible wavelength range (i.e., visible light) to travel through the coating layer.

The high emissivity coating layer is formed from a high emissivity coating composition comprising a carbon-doped silicon oxide according to the formula $Si_xO_yC_z$, wherein the subscripts x, y and z represent weight percent fractions of silicon, oxygen and carbon atoms in said high emissivity coating composition, and wherein x ranges from 10 to 80 weight percent, y ranges from 20 to 90 weight percent, and z ranges from 2 to 50 weight percent, and wherein the sum of x+y+z is 100 weight percent.

The treated substrate has an emissivity ($E_n$) of from greater than 0 to 0.3 at wavelengths below 6 micrometers and also has an emissivity of from 0.7 to less than 1.0 at wavelengths ranging from 8 micrometers to 13 micrometers, with the emissivity measured using a Fourier-transform infrared spectrometer. The treated substrate also maintains a visually acceptable mechanical brush durability resistance for at least 150 test cycles tested in accordance with ASTM D2486-17.

The combination of low and high emissivity coating layers applied to the substantially transparent substrate functions to block infrared light radiation and ultraviolet light radiation of direct sunlight passing through the substrate without unacceptably affecting the amount of visible light that is transmitted through the substrate. In particular, when the treated substrate is included in a window frame of a vehicle, the low emissivity layer of the treated substrate functions to block a majority of infrared light radiation and ultraviolet light radiation of direct sunlight into the passenger compartment (and minimizes heat buildup on the substrate associated with infrared and ultraviolet light transmission through the substrate), while allowing a majority of the visible light to pass therethrough. Still further, the high emissivity layer functions to draw out any heat generated on the substrate due to light transmission through the substrate and away from the passenger compartment (i.e., interior space of a structure including the treated substrate installed within an opening). This results is a cooler passenger compartment as compared with vehicles having untreated substrates subjected to the same conditions of direct sunlight. The same principle allows the use of the treated substrate as described above in non-automotive applications, such as for example as outer windows for buildings.

Yet still further, the inclusion of the high emissivity layer provides a durable outer layer to the treated substrate that protects the softer, underlying low emissivity layer from damage due to scratching or the like during installation and during subsequent use. The included high emissivity layer also allows the treated substrate to be installed in a structure with the coating layers directed towards, or away from, the interior space and outer surface as desired.

BRIEF DESCRIPTION OF THE DRAWINGS

Advantages of the subject invention will be readily appreciated as the same becomes better understood by reference to the following detailed description when considered in connection with the accompanying drawing.

DETAILED DESCRIPTION OF THE INVENTION

Referring to the embodiments provided herein, the subject invention is directed to a treated substrate 12 that can be included within a passive radiative cooling system 10.

Figure 2:
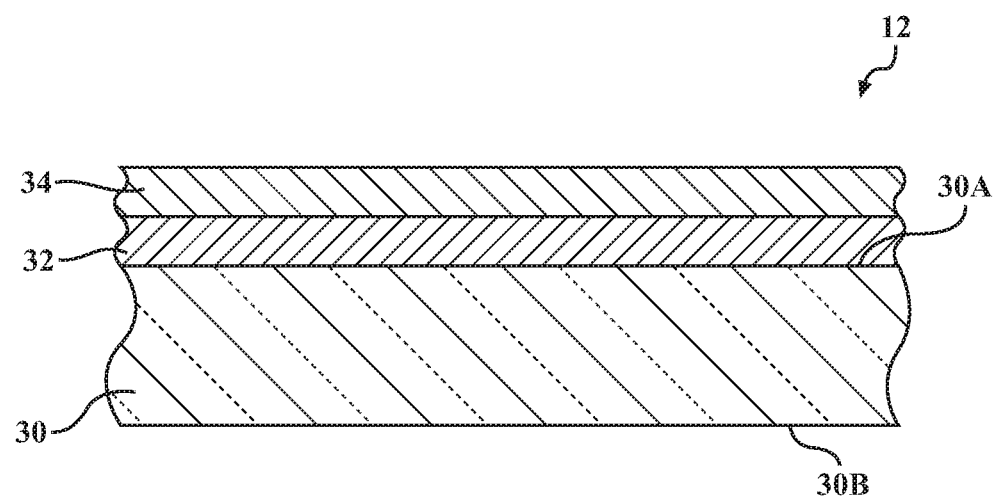
FIG. 2 is a perspective side view of a treated substrate formed from a single substrate layer in accordance with one embodiment of the subject invention.

The treated substrate 12 in accordance with the subject invention includes a substrate, a low emissivity coating layer disposed on the substrate, and a high emissivity coating layer disposed on the low emissivity coating layer. The substrate can be a single layer substrate 30, as shown in FIG. 2, or alternatively can be a multilayer substrate, such as a laminated glass panel assembly 130, as shown in FIG. 3 and described below.

The term "disposed on", as provided herein, is used to describe the relationship between adjacent layers of the treated substrate 12. In certain embodiments, the term "disposed on" can simply refer to the positioning of one of the adjacent layers next to the other one of the adjacent layers. In still further embodiments, the term "disposed on" can refer to the relationship wherein the adjacent layers are bonded to one another, such as by chemical bonding. In still further embodiments, the term "disposed on" can refer to the relationship wherein the adjacent layers are adhered to another manner that may not be considered chemical bonding, such as through hydrogen bonding, acid-base interaction, frictional engagement or any another type of mechanical interaction.

The passive radiative cooling system 10, or system 10, includes a structure 14 having an interior region 16. The structure 14 also includes an opening 18 through which direct sunlight can pass from the exterior to within the interior region 16. Hence the structure 14 defines the interior region 16 and the opening 18. The treated substrate 12 is positioned within the opening 18 and functions as a physical barrier between the external environment and the interior region 16.

Figure 1:
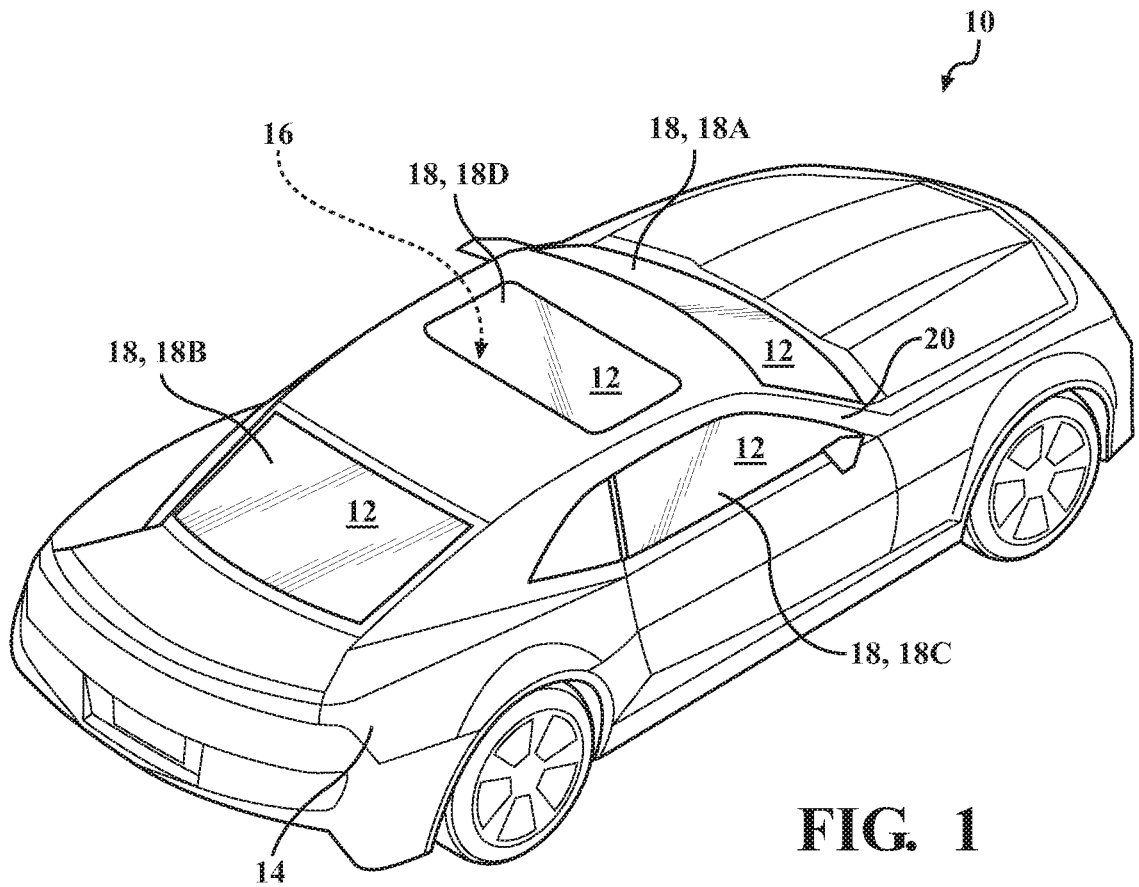
FIG. 1 is a perspective view of a vehicle having the treated substrate in accordance with the present invention.

In the representative embodiment shown in FIG. 1, the structure 14 is a vehicle 14, such as an automobile, and the interior region 16 corresponds to the passenger compartment of the vehicle 14. Further, the opening 18 corresponds to an opening within a frame 20 of the vehicle 14, such as an A-pillar or B-pillar of a vehicle 14, with the frame 20 at least partially defining the passenger compartment 16. In the embodiment shown in FIG. 1, the frame 20 includes openings 18 corresponding to the front window 18A, the rear window 18B, one or more side windows 18C, or one or more sunroofs 18D of the vehicle 14 (the openings 18A, 18B, 18C and 18D are referred to hereinafter as openings 18), and one of the treated substrates 12 is installed within a respective one of these openings 18.

While the treated substrate 12 is shown installed within respective openings 18 of the frame 20 in the vehicle 14 as in FIG. 1, the treated substrate 12 may be used in any opening 18 of a structure 14 to an interior region 16 in which a substantially transparent substrate 12 is installed to allow light passage into the interior region for a particular application. In particular, the treated substrate 12 could be in the form of an architectural glazing that is installed as a window in a commercial or residential building (with the building defining the structure 14), and wherein the interior region 16 includes an office or room within the building 14. In this context, the term "frame", as in frame 20, may refer to any component of the building 14 that partially defines the opening 18 into which the treated substrate 12 is installed, such as within a wall or window frame that defines the opening 18 therewithin.

As will be described in further detail below, the inclusion of the low and high emissivity coating layers 32, 34 on the substrate 30, to form the treated substrate 12, provides the treated substrate with a desired emissivity profile for wavelengths of light in the electromagnetic spectrum corresponding to direct sunlight. In the embodiments described herein, the spectrum of wavelengths of light (i.e., electromagnetic radiation) for the embodiments described herein ranges between about 0 micrometers (micrometers) and 20 micrometers (micrometers), and therefore includes infrared radiation, visible radiation (i.e., wavelengths of light in the range of roughly 0.38 to 0.78 micrometers (roughly 380-780 nanometers)).

The term "emissivity" ($E_n$), as it relates to the emissivity profile of the treated substrate 12, is defined as the ratio of the energy radiated from a material's surface (here, the treated substrate 12) to that radiated from a blackbody (a perfect emitter) at the same temperature and wavelength and under the same viewing conditions as given by the Stefan-Boltzmann law. The ratio varies from 0 to 1.0. A black body would have an emissivity of 1.0, and a perfect reflector would have a value of 0, at a particular wavelength.

In particular, in the embodiments described herein, the introduction of the low and high emissivity layers 32, 34 to the substrate 30 forms a treated substrate 12 having an emissivity of from greater than 0 to 0.3 at wavelengths below 7 micrometers, such as from greater than 0 to 0.25 at wavelengths below 7 micrometers, such as from greater than 0 to 0.3 at wavelengths between 0 and 7 micrometers, such as from greater than 0 to 0.25 at wavelengths between 0 and 7 micrometers, such as from greater than 0 to 0.3 at wavelengths below 6 micrometers, such as from greater than 0 to 0.25 at wavelengths below 6 micrometers, such as from greater than 0 to 0.3 at wavelengths between 0 and 6 micrometers, or such as from greater than 0 to 0.25 at wavelengths between 0 and 6 micrometers.

Still further, the introduction of the low and high emissivity layers 32, 34 to the substrate 30 forms a treated substrate 12 having an emissivity of from 0.7 to less than 1.0 at wavelengths ranging from 7 to 14 micrometers, such as from 0.8 to less than 1.0 at wavelengths ranging from 7 to 14 micrometers, such as from 0.7 to less than 1.0 at wavelengths ranging from 8 to 13 micrometers, or such as from 0.8 to less than 1.0 at wavelengths ranging from 8 to 13 micrometers.

In addition to emissivity, the inclusion of the low and high emissivity coating layers 32, 34 on the substrate 30 increases the thermal cooling performance to the interior region 16 of the structure 14, when the treated substrate 12 is installed within an opening 18, as compared to the use of untreated substrates (i.e., substrates 30 without the low and high emissivity coating layers 32, 34), when such untreated substrates or treated substrates 12 are included in structures 14 or associated passive radiative cooling systems 10.

Moreover, the inclusion of the high emissivity coating layer 34 in combination with the low emissivity layer 32 provides enhanced thermal cooling performance to the interior region 16 of the structure 14, when the treated substrate 12 is installed within an opening 18, as compared to the use of substrates including only the low emissivity layer 32, when such treated substrates 12 are included in structures 14 or associated passive radiative cooling systems 10.

Still further, the inclusion of the high emissivity coating layer 34 disposed on the low emissivity layer 32 provides a durable outer layer to the treated substrate 12 as compared with treated substrates 12 including the low emissivity layer 32 alone. Such treated substrates, including both the low and high emissivity coating layers 32, 34, disposed on the substrate 30 in accordance with the subject invention, achieve an acceptable mechanical brush durability resistance (corresponding to no damage to the applied coating layers in visual observation) for at least 150 test cycles, with the test cycles performed using a scrubbing device in accordance with ASTM D2486-17 as will be described in the Examples further below.

I. Substrate

The substrate utilized in the present invention can be a single, integrally formed material, as illustrated by the substrate 30 in FIG. 2, or can be a multi-layer substrate material, such as a laminated glass assembly 130 as in FIG. 3, that is used to form the treated substrate 12.

In certain embodiments, and as illustrated in FIG. 2, the substrate 30 is a single, integrally formed material having opposing side surfaces 30A, 30B. In these embodiments, the low emissivity coating layer 32 is disposed on a first side surface 30A (i.e., first surface) of the substrate 30, and the high emissivity coating layer 34 disposed on the low emissivity coating layer 32 such that the low emissivity coating layer 32 is disposed between the first side surface 30A of the substrate 30 and the high emissivity coating layer 34 and such that the first side surface 30A is between the second side surface 30B (i.e., second surface) and the low emissivity coating layer 32.

In one embodiment, when installed within an opening 18 of a structure, the side surface 30A (which includes the low and high emissivity coating layers 32, 34) is positioned adjacent to the interior region 16, while the opposing side surface 30B is positioned towards the exterior of the structure 14. In an alternative embodiment, the opposite occurs, wherein the side surface 30A (which includes the low and high emissivity coating layers 32, 34) is positioned towards the exterior of the structure 14, while the opposing side surface 30B is positioned adjacent to the interior region 16.

The single layer substrate 30 may be rigid or flexible material. In certain embodiments, the rigid or flexible material is also substantially transparent. As defined herein, the term "substantially transparent", as used with respect to the substrate, refers to a material that allows 70% or more of light transmission in a predefined visible light range to travel therethrough.

Examples of suitable rigid, substantially transparent single layer substrates 30 include inorganic materials, such as glass plates or panels. The panes of glass are preferably automotive glass and, more specifically, soda-lime-silica glass. In another embodiment, the glass panel is a tempered glass panel, which is a single layer glass panel that has been processed by controlled thermal or chemical treatments to increase its strength compared to normal glass (i.e., untempered glass such as the soda-lime-silica glass or annealed glass).

In other embodiments, it may be desirable for the substrate 30 to be flexible (i.e., a flexible substrate). In these embodiments, specific examples of the flexible, substantially transparent substrate 30 include those comprising various organic polymers. From the view point of transparency, refractive index, heat resistance and durability, specific examples of the flexible substrate include those comprising polyolefins (polyethylene, polypropylene, etc.), polyesters (poly(ethylene terephthalate), poly(ethylene naphthalate), etc.), polyamides (nylon 6, nylon 6,6, etc.), polystyrene, poly(vinyl chloride), polyimides, polycarbonates, polynorbornenes, polyurethanes, poly(vinyl alcohol), poly(ethylene vinyl alcohol), polyacrylics, celluloses (triacetylcellulose, diacetylcellulose, cellophane, etc.), or interpolymers (e.g. copolymers) of such organic polymers.

Further, in certain embodiments, the single-layer substrate 30 may be reinforced, e.g. with fillers and/or fibers.

In still further embodiments, such as shown in FIGS. 3A-3D, as opposed to being in the form of a single, integrally formed material as in FIG. 2, the substrate 30 is in the form of a laminated glass panel assembly 130 that includes an inner transparent sheet 132 and an outer transparent sheet 134. When installed within an opening 18, the inner transparent sheet 132 is positioned adjacent to the interior region 16, while the outer transparent sheet 134 is positioned towards the exterior of the structure 14.

In certain embodiments, the respective inner and outer transparent sheets 132, 134 are formed from the same materials described above with respect to the substrate 30. In certain embodiments, for example, the inner and outer transparent sheets 132, 134 are panes of glass that are substantially transparent. However, in other embodiments, the inner and outer transparent sheets 132, 134 may be plastic, fiberglass, or any other suitable substantially transparent material such as those described above. In other embodiments, the inner and outer transparent sheets 132, 134 are panes of glass that are less transparent. For example, wherein the glass assembly 130 is a privacy glass, the transparency of the glass assembly 130 is substantially reduced, and thus allows less than 70% light transmission in a predefined wavelength range, such as from greater than 0 to 70% light transmission at the predefined wavelength range.

As also shown in FIGS. 3A-3D, the laminated glass panel assembly 130 further includes an interlayer 136 disposed between the inner and outer transparent sheets 132, 134. In certain embodiments, the interlayer 136 bonds the inner and outer transparent sheets 132, 134 and allows the laminated glass panel assembly 130 to retain glass panel pieces upon impact or breakage.

The interlayer 136 typically is typically substantially transparent to light and includes a polymer or thermoplastic resin, such as polyvinyl butyral (PVB). However, other suitable materials for implementing the interlayer 136 may be utilized. Similar to the inner and outer transparent sheets 132, 134, the interlayer 136 is also substantially transparent or otherwise transparent to light, and accordingly the laminated glass panel assembly 130 that includes the interlayer 136 between the inner and outer transparent sheets 132, 134 is also substantially transparent or otherwise transparent to light.

In embodiments including the interlayer 136, such as shown in FIGS. 3A-3D, the inner transparent sheet 132 includes opposing outwardly and inwardly facing surfaces 132A and 132B. Similarly, the outer transparent sheet 134 includes opposing outwardly and inwardly facing surfaces 134A and 134B. In these embodiments, the inwardly facing surfaces 132A and 134A are positioned adjacent to the interlayer 136, forming the assembly 130 in which the inwardly facing surfaces 132B, 134B are positioned between the interlayer 136 and the outwardly facing surfaces 132A, 134A.

Figure 3A:
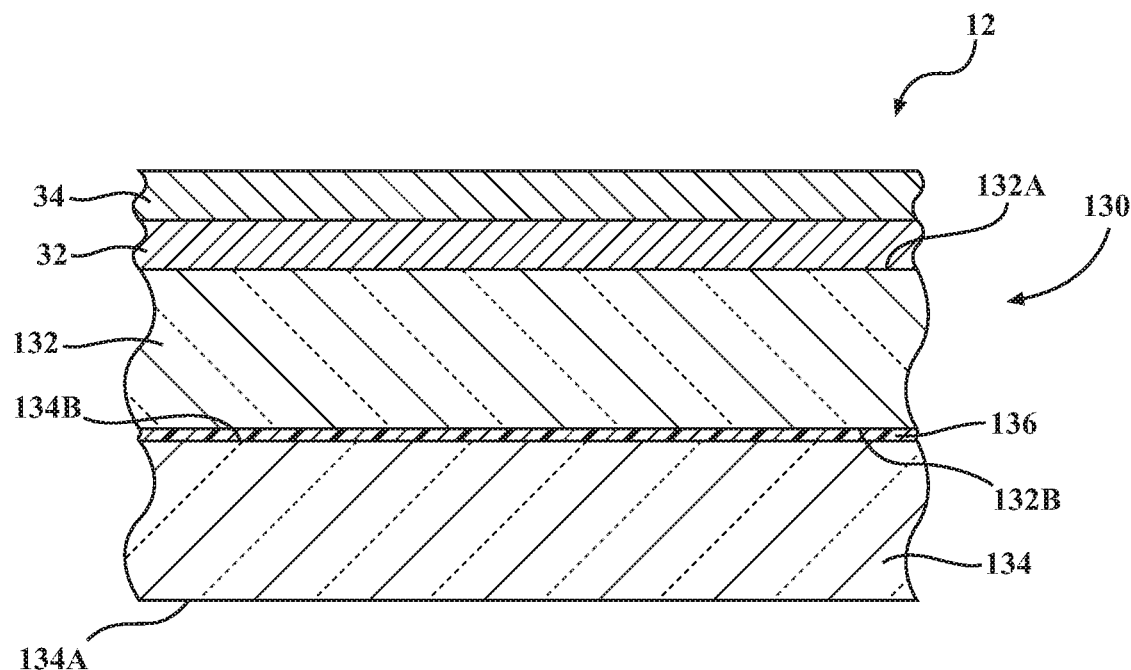
FIGS. 3A-3D are perspective side views a laminated glass assembly for use as the treated substrate, with the laminated glass assembly including low emissivity and high emissivity coatings disposed on one of the inwardly or outwardly facing surfaces of one of a first or second inner transparent sheet according to additional embodiments of the subject invention.
Figure 3B:
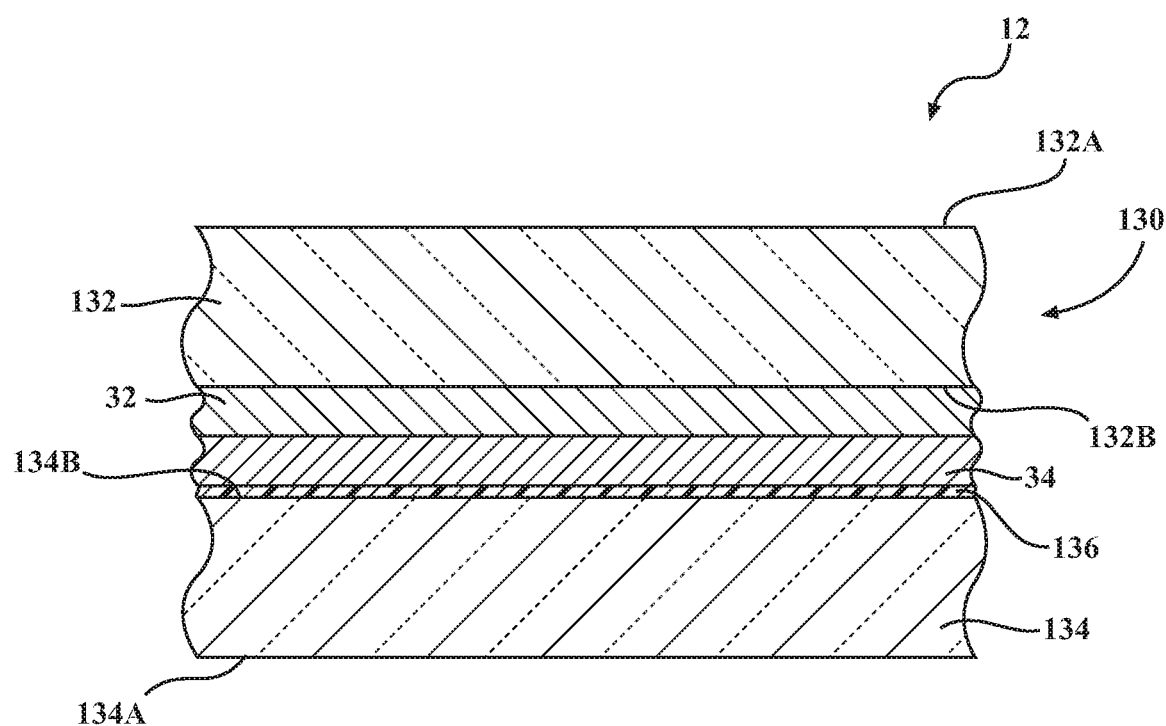
Figure 3C:
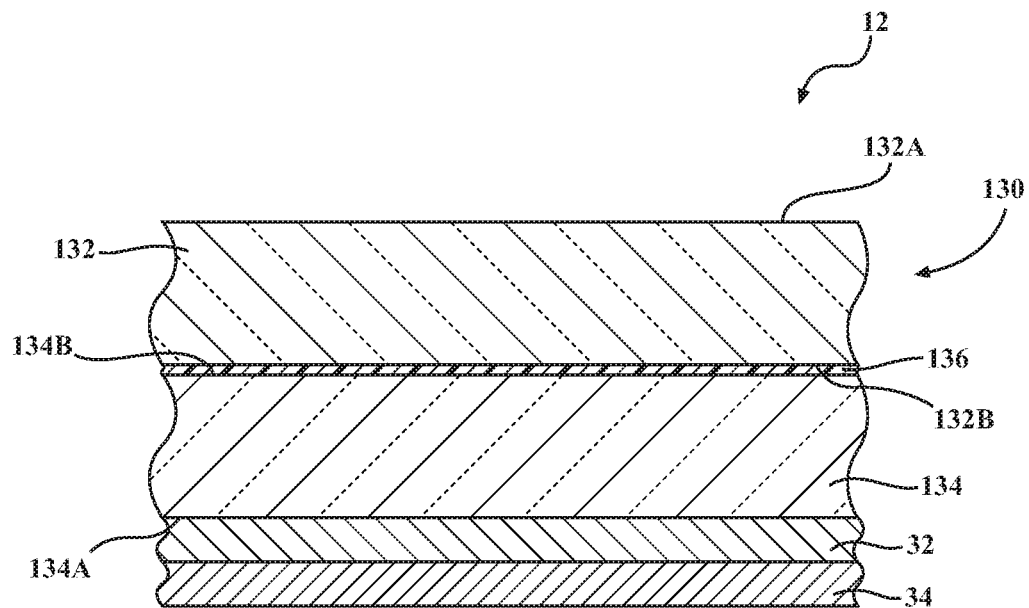
Figure 3D:
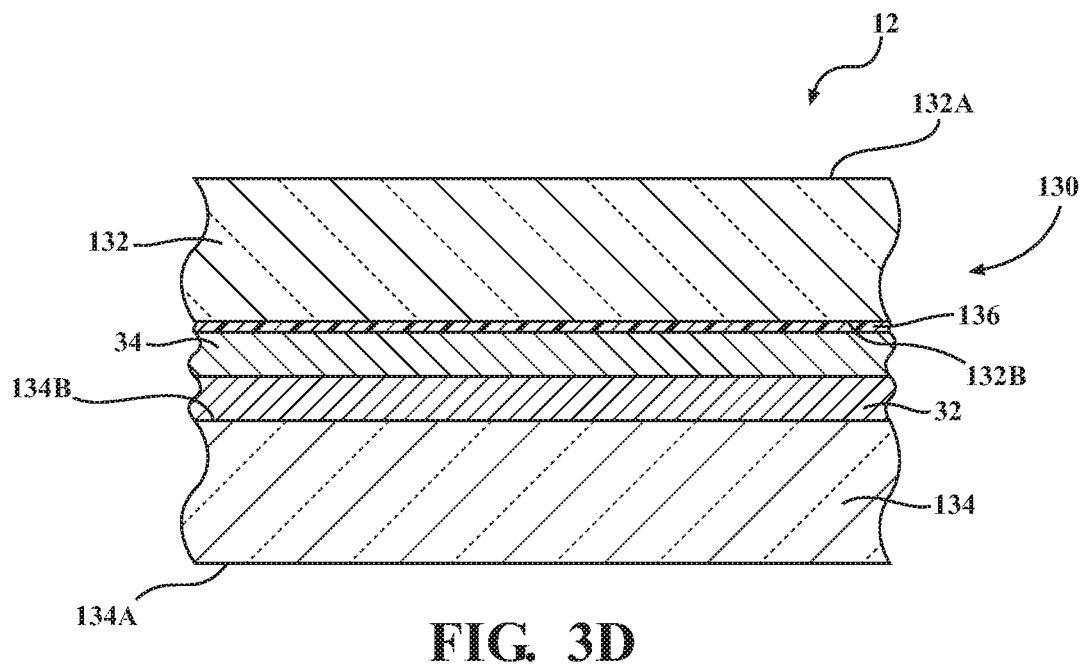

In one embodiment, as shown in FIG. 3A, the low and high emissivity coating layers 32, 34 are applied sequentially to the outwardly facing surface 132A of the inner transparent sheet 132. In another alternative embodiment, as shown in FIG. 3B, the low and high emissivity coating layers 32, 34 are applied sequentially to the inwardly facing surface 132B of the inner transparent sheet 132, and are thus disposed between the inwardly facing surface 132B and the interlayer 136. In yet another embodiment, as shown in FIG. 3C, the low and high emissivity coating layers 32, 34 are applied sequentially to the outwardly facing surface 134A of the outer transparent sheet 134. In yet still another alternative embodiment, as shown in FIG. 3D, the low and high emissivity coating layers 32, 34 are applied sequentially to an inwardly facing surface 134B of the outer transparent sheet 134, and are thus disposed between the inwardly facing surface 134B and the interlayer 136.

II. Low Emissivity Coating Layer

As noted above, the treated substrate 12 also includes low emissivity coating layer 32 disposed on the substrate 30.

The low emissivity coating layer 32 includes one or more layers, although in many embodiments it is a multi-layer coating, with each layer formed from a coating composition that collectively provide the desired low emissivity function.

The low emissivity coating layer 32 is configured to block (i.e., reflect and/or absorb) certain amounts of IR (infrared) radiation and, in certain embodiments, is also configured to block certain amounts of ultraviolet (UV) radiation and prevent the same from reaching the passenger compartment of a vehicle (or to prevent IR and/or UV radiation from reaching the interior of a building). The low emissivity coating layer 32 is also configured to allow a vast majority of the transmission of radiation in the visible wavelength range (i.e., visible light) to travel through the coating layer 32, and as such is considered a transparent coating layer 32 as viewed by humans.

Accordingly, the low emissivity coating layer 32 may include one or more IR blocking layers that each respectively include at least one IR blocking material such as silver (Ag), and/or transparent conductive oxides such as (but not limited to) indium tin oxide, zinc oxide, and/or fluorine-doped tin oxide, and/or any other suitable material that blocks significant amounts of IR radiation. It will be appreciated by those skilled in the art that IR blocking materials of the need not block all IR radiation, but only need to block amounts thereof. Similarly, it will be appreciated by those skilled in the art that UV blocking materials need not block all UV radiation, but only need to block amounts thereof.

In certain embodiments, the IR blocking layer is provided between at least a pair of dielectric layers. Example dielectric layers include silicon nitride, titanium oxide, silicon oxynitride, tin oxide, and/or other types of metal-alloy-oxides and/or metal-alloy-nitrides. Exemplary other types of metal oxides include, but are not limited to, zinc tin oxide, aluminum zinc oxide, nickel chrome oxide, silver oxide and zinc oxide. In certain embodiments, in addition to being between a pair of dielectric layers, each IR blocking layer may also be provided between a pair of contact layers of or including a material such as an oxide and/or a nitride of nickel-chrome or any other suitable material.

In general, the low emissivity coating layer 32 may include one or more dielectric layers (i.e., a barrier layer or layers of metal oxide and/or metal nitride) applied to the substrate 30, followed by one or more seeding layers (typically one or more layers of a metal oxide), followed by one or more layers of silver, and followed by one or more protection layers (typically one or more layers of a metal, a metal oxide, a metal nitride, or any combination thereof).

One exemplary low emissivity coating composition for use in forming the low emissivity coating layer 32 is the IRIS Neutral coating composition, commercially available from AGC Glass Europe, which is a complex stack of different thin metallic coatings (including various layers of metal oxides and silver), deposited directly onto the substrate 30 by a magnetron sputtering process.

Other exemplary low emissivity coating composition for use in forming the low emissivity coating layer 32 include silver oxide compositions, indium tin oxide compositions, fluorine-doped tin oxide compositions, and silver-based compositions (single, double, and triple silver coating compositions). Still further exemplary low emissivity coating compositions for use in forming the low emissivity coating layer 32 are described in U.S. Pat. No. 7,901,781, issued on Mar. 8, 2011 and assigned to AGC Flat Glass North America, Inc.; and U.S. Pat. No. 9,709,717, issued on Jul. 18, 2017 and assigned to AGC Glass Europe, the contents of which are herein incorporated by reference in their entirety.

It is noted that the low emissivity coating layer 32 is not limited to the precise coatings or individual layers described above, as any suitable low emissivity coating layer 32 may be used in alternative embodiments of this invention.

In certain embodiments, the low emissivity coating layer 32 is disposed onto the substrate to a thickness ranging from 50 to 500 nanometers (i.e., 0.05 to 0.5 microns), such as from 130 to 350 nanometers, such as from 150 to 250 nanometers, such as about 200 nanometers.

III. High Emissivity Coating Layer

As noted above, the treated substrate 12 also includes a high emissivity coating layer 34 disposed on the low emissivity coating layer 32.

The high emissivity coating layer 34 provides the treated substrate 12 with improved passive radiative cooling for removing heat from the underlying low emissivity coating layer 32, the substrate 30, and the passenger compartment 24 of the vehicle 20 (in applications wherein the treated substrate 12 is introduced within an opening of the frame 22). In addition, the high emissivity coating layer 34 also provides a harder, more durable outer coating layer than the underlying low emissivity coating layer 32.

The high emissivity coating layer 34 is formed from a high emissivity coating composition according to the formula $Si_xO_yC_z$, wherein the subscripts x, y and z represent weight percent fractions of silicon, oxygen and carbon atoms in the high emissivity coating composition. In particular, the high emissivity coating composition according to the formula $Si_xO_yC_z$ includes wherein x ranges from 10 to 80 weight percent, y ranges from 20 to 90 weight percent, and z ranges from 2 to 50 weight percent, and wherein the sum of x+y+z is 100 weight percent. The relative amounts of x, y and z may vary within the ranges provided above based upon application optics requirements for the particular passive radiative coating system 10.

One exemplary high emissivity composition according to the formula $Si_xO_yC_z$ is composition according to the formula $Si_{30}O_{60}C_{10}$, wherein the subscripts 30, 60 and 10 refer to the weight percentages of silicon, oxygen and carbon, respectively (i.e., $Si_{30}O_{60}C_{10}$ does not refer to a composition wherein the subscripts 30, 60 and 10 refer to molar ratios).

In certain embodiments, the high emissivity composition according to the formula $Si_xO_yC_z$ for application onto the low emissivity coating layer 14 may be formed from a silicon based-organometallic precursors such as tetramethyldisiloxane (TMDSO), TSA, silane, HMDSO and the like.

In particular, the precursor described above was transformed into the high emissivity coating composition using a linear hollow cathode PECVD process. In one exemplary method, the hollow cathode electrodes used in the linear hollow cathode PECVD process includes an inline water cooled linear closed-tube (cavity) with an inlet for plasma gas and arrays of nozzle outlets. Oxygen which is used as a reactive plasma gas is injected into the electrode cavity through the inlet ports. With the help of electrical power, the oxygen in the electrode cavity is ignited to form a high density plasma in the cavity. The plasma is ejected into the deposition chamber through multiples arrays of nozzles. During the deposition, the precursor vapor was injected into the process chamber where it interacts with a high density oxygen plasma near the substrate 12 (including the previously applied low emissivity coating layer 32). The oxygen plasma/precursor interaction leads to the dissociation of the precursor materials, where silicon bonds with the oxygen to form a dense high emissivity coating layer 34 according to the formula $Si_xO_yC_z$ that is deposited onto the low emissivity coating layer 32, while the remaining organic remnants of the precursor are pumped out of the chamber and exhausted.

In certain embodiments, the high emissivity coating layer 34 is disposed onto the low emissivity coating layer 32 (such as through PECVD using the precursor as described above) to a thickness ranging from 3,000 to 50,000 nanometers (i.e., 3 to 50 micrometers (microns)), such as from 5,000 to 20,000 nanometers. When the treated substrate 12 is installed within the sunroof opening 18D in a vehicle 14, the thickness of the high emissivity coating layer 34 may range from 10,000 to 50,000 nanometers. Conversely, when the treated substrate 12 is installed within the side window opening 18C in a vehicle 14, the thickness of the high emissivity coating layer 34 may range from 3,000 to 10,000 nanometers.

IV. Method of Producing a Treated Substrate

The subject invention is also directed to a method for producing a treated substrate utilizing the afore-mentioned low emissivity coating composition and high emissivity coating composition, each in accordance with the subject invention.

The method is slightly altered depending upon whether the substrate is the integrally formed or single transparent substrate 30 as provided in FIG. 2, or as a laminated glass assembly 130, as provided in FIG. 3.

With respect to the use of the substrate 30, as in FIG. 2, the method begins by providing the substrate 30 as described above. Preferably, the substrate 30 has been cleaned using a solvent or an appropriate cleaning treatment known to those of ordinary skill. By way of example, the substrate 30 may be cleaned first to meet vacuum coating requirements such as with soap water and/or with a $CeO_2$ solution, then rinsed with deionized water and dried using compressed air.

The method continues by applying the low emissivity coating composition onto at least a part of a surface 30A or 30B of a substrate 30 to form the low emissivity coating layer 32 disposed on the substrate 30. The method of application of the low emissivity coating composition is not limited, and may include applying the composition by a chemical vapor deposition (CVD), a plasma enhanced chemical vapor deposition (PECVD), a magnetron sputtering, an ion-beam assisted deposition, or the like. In certain embodiments, the applied low emissivity coating forms a low emissivity coating layer 32 having a thickness of from 50 to 500 nanometers (i.e., 0.05 to 0.5 microns), such as from 130 to 350 nanometers, such as from 150 to 250 nanometers, such as about 200 nanometers, as noted above.

Next, the method continues by applying the high emissivity coating composition onto the formed low emissivity coating layer 32 to form the high emissivity coating layer 34, wherein the low emissivity coating layer 32 is disposed between the respective surface 30A or 30B and high emissivity coating layer 34. The method of application may be the same or different as the application of the low emissivity coating composition, and may include applying the high emissivity coating composition by a spray application, a dipping application, a wiping application, or the like. In certain embodiments, the plasma enhanced chemical vapor deposition process (PECVD) application is used (wherein the silicon based-organometallic precursor, as described above, is transformed to the high emissivity coating composition prior to deposition as described above). In certain embodiments, the applied high emissivity coating forms a high emissivity coating layer 34 having a thickness of from 3,000 to 50,000 nanometers (i.e., 3 to 50 microns), such as from 5,000 to 20,000 nanometers, as noted above.

With respect to the use of the laminated glass assembly 130 as the substrate, the method used for forming the treated substrate 12 is dependent upon whether the layers 32, 34 are disposed on an outwardly facing surface 132A, 134A or an inwardly facing surface 132B, 134B.

If the layers 32, 34 are to be disposed on an outwardly facing surface 132A, 134A as in FIG. 3A or 3C, the laminated glass assembly 130 may be pre-formed with the interlayer 136 disposed between, and preferably bonded to, the respective inwardly facing surfaces 132B, 134B. The method for applying the layers 32, 34 proceeds in the same manner as provided above wherein the layers 32, 34 are applied to integrally formed substrate 30, wherein the low emissivity coating composition is applied to one of the outwardly facing surfaces 132A, 134A to form the low emissivity coating layer 32 disposed on the respective one outwardly facing surface 132A or 134A followed by the application of the high emissivity coating composition onto the formed low emissivity coating layer 32 to form the high emissivity coating layer 34 disposed on the low emissivity coating layer opposite the respective one outwardly facing surface 132A or 134A.

However, if the layers 32, 34 are to be disposed on an inwardly facing surface 132B, 134B, as in FIG. 3B or 3D, the laminated glass assembly 130 cannot be pre-formed with the interlayer 136 disposed between, and preferably bonded to, the respective inwardly facing surfaces 132B, 134B. Instead, the layers 32, 34 must be applied to the respective inwardly facing surface 132B or 134B prior to the interlayer 136 being disposed between, and preferably bonded to, the transparent sheets 132, 134.

For ease of description, the method for forming the treated substrate 12 in this manner is described wherein the layers 32, 34 are applied to the inwardly facing surface 132B of the first transparent sheet 132 as in FIG. 3B, although the same method could be used wherein the wherein the layers 32, 34 are applied to the inwardly facing surface 134B of the second transparent sheet 134.

The method begins preferably cleaning, rinsing and drying the transparent sheets 132, 134 as described above. Next, the method continues by applying the low emissivity coating composition onto at least a part of the respective inwardly facing surface 132B to form the low emissivity coating layer 32 disposed on the inwardly facing surface 132B. The method of application of the low emissivity coating composition is not limited, and includes any of the methods described above (CVD, PECVD, magnetron sputtering, or the like). Preferably, if multiple layers are applied, such application of the subsequent layers is within approximately thirty seconds of the previous layer. In certain embodiments, the applied low emissivity coating forms a low emissivity coating layer 32 on the inwardly facing surface 132A having a thickness of from 50 to 500 nanometers (i.e., 0.05 to 0.5 microns), such as from 130 to 350 nanometers, such as from 150 to 250 nanometers, such as about 165 nanometers, as noted above.

Next, the method continues by applying the high emissivity coating composition onto the formed low emissivity coating layer 32 to form the high emissivity coating layer 34. The method of application may be the same or different as the application of the low emissivity coating composition, and may include applying the high emissivity coating composition according to any of the methods described above (spray application, dipping application, wiping application, PECVD, or the like). In certain embodiments, the applied high emissivity coating forms a high emissivity coating layer 34 having a thickness of from 3,000 to 50,000 nanometers (i.e., 3 to 50 microns), such as from 5,000 to 20,000 nanometers, as noted above.

Next, and optionally, the outer surface of the formed high emissivity layer 34 opposite the inwardly facing surface 132B may be wiped with the solvent.

Next, an interlayer 136 is introduced between the first and second transparent sheets 132, 134 such that the interlayer 136 is adjacent to the high emissivity layer 34 on one side and adjacent to the inwardly facing surface 134B of the second transparent sheet 134 on the opposite side.

Next, the interlayer 136 may be bonded to each of the high emissivity layer 34 on one side and adjacent to the inwardly facing surface 134B of the second transparent sheet 134 to form the treated substrate 12.

Finally, and optionally, the produced treated substrate 12 may be cleaned using a solvent such as isopropyl alcohol or acetone. More specifically, the outwardly facing surfaces 132A, 134A of the first and second transparent sheets 132, 134 may be cleaned using a solvent such as isopropyl alcohol or acetone.

The treated substrate 12 of the subject invention may be used as an article for a transport equipment in the transportation industry. The article for a transport equipment may, for example, be a body of e.g. an electric train, an automobile, a ship or an aircraft, window glass (front glass, side glass or rear glass), a mirror or a bumper.

In particular, the treated substrate of the subject invention may be utilized as window glass for a vehicle such as an automobile or truck. In particular, the treated substrate of the subject invention may be utilized as side window glass for a vehicle such as an automobile or truck or as a sunroof on the same vehicle or truck.

Now, the subject invention will be described with reference to Examples. However, the subject invention is by no means restricted to such specific Examples.

Examples

In the Examples provided herein, samples comparing the performance of glass substrates with and without the introduction of the low and high emissivity coating layers, were evaluated for light emissivity, durability, and cooling ability in certain test conditions. The results confirm the improved properties for treated substrates including a combination of the low and high emissivity coating layers in accordance with the subject invention as compared with untreated substrates or substrates including only the low emissivity coating layer, as described below.

The Low Emissivity and High Emissivity Coating Composition

The low emissivity coating composition utilized in the Examples was IRIS Neutral coating composition, commercially available from AGC Europe, as described generally above.

The high emissivity coating composition used in the Examples was according to the formula $Si_xO_yC_z$, wherein x is 30 weight percent, y is 60 weight percent, and z is 10 weight percent.

Method of Producing the Treated Substrates

The method for producing the treated substrates evaluated in the subject invention were as follows:

First, a rigid glass panel of soda-lime-silica glass having a thickness ranging from 1.6 to 6 millimeters was obtained and cleaned with a 2% $CeO_2$ solution. The glass panel was then rinsed with deionized water, and dried using compressed air.

Next, in certain of the samples, the low emissivity coating composition, as described above, was applied in one or more layers onto the glass substrate to a thickness of approximately 0.3 microns by magnetron sputtering.

In particular, the IRIS Neutral coating composition, commercially available from AGC Europe, was deposited onto glass surface by using magnetron sputtering to a target total thickness of around 100-450 nanometers (around 1000-4500 Angstroms). In particular, the IRIS Neutral coating composition was applied (i.e., via magnetic sputtering) onto the glass substrate in consecutive layers onto the glass substrate as follows: one or more layers of a barrier coating of metal oxide and one or more layers of a seeding coating of metal oxide applied to a target thickness of around 50-300 Angstroms; one or more layer of silver applied to a target thickness of 10-100 Angstroms; and one or more layers of a protection coating of metal applied to a target thickness of 10-50 Angstroms.

Next, in certain of the samples, the high emissivity coating composition according to the formula $Si_{30}O_{60}C_{10}$ was applied onto the low emissivity coating layer by PECVD to form a high emissivity coating layer having a thickness of approximately 5 microns.

In particular, TMDSO tetramethyldisiloxane (TMDSO) was used as a precursor which was transformed into a high emissivity coating composition using a linear hollow cathode PECVD process. In particular, the hollow cathode electrodes used in the linear hollow cathode PECVD process included an inline water cooled linear closed-tube (cavity) with an inlet for plasma gas and arrays of nozzle outlets. Oxygen used as a reactive plasma gas was injected into the electrode cavity through the inlet ports. With the help of electrical power, the oxygen in the electrode cavity was ignited to form a high density plasma in the cavity. The plasma was ejected into the deposition chamber through multiples arrays of nozzles. During the deposition, the TMDSO precursor vapor was injected into the process chamber where it interacted with a high density oxygen plasma near the substrate (including the previously applied low emissivity coating layer). The oxygen plasma/precursor interaction led to the dissociation of the TMDSO precursor, where silicon was bonded with the oxygen to form the dense high emissivity coating layer according to the formula $Si_{30}O_{60}C_{10}$ that was deposited onto the low emissivity coating layer at a thickness of approximately 5 microns, while the remaining organic remnants of the TMDSO precursor were pumped out of the chamber and exhausted.

Finally, the formed treated substrates were cleaned using a solvent such as isopropyl alcohol or acetone.

Initial Evaluation of Samples for Light Emissivity

Samples of the rigid glass panel alone, the rigid glass panel (Glass, as shown in Table 1 below) including the low emissivity coating layer (Low E coating as shown in Table 1 below), and the rigid glass panel including both the low emissivity coating layer and the high emissivity coating layer (High E Coating as shown in Table 1 below) formed in the method described above were first evaluated for light emissivity using an FTIR spectrophotometer (Fourier-transform infrared spectrometer) at wavelengths ranging in the near infrared wavelength range (NIR, corresponding to wavelengths corresponding to 0.75 to 2.5 micrometers) and passive cooling range (corresponding to wavelengths from 8 to 13 micrometers). Samples were evaluated on a scale of 0 to 1, as described above.

TABLE 1

|  | Emissivity | |
| --- | --- | --- |
|  | NIR (0.75-2.5 um) | Passive cooling range 8-13 um |
| Glass | 0.86-0.92 | 0.86-0.92 |
| Glass/Low E coating | 0.21 | 0.05 |
| Glass/Low E/High E | 0.23 | 0.82 |

The results are provided in Table 1 illustrate that the introduction of the low emissivity coating layer to the rigid glass substrate decreased the light emissivity to levels to values less than 0.25 in both the near infrared range and the passive cooling range, and illustrates that the values are less than the corresponding values of the rigid glass substrate alone. Table 1 also illustrates that the further introduction of the high emissivity coating layer to rigid glass substrate including the low emissivity layer increased the light emissivity in the passive cooling range to values greater than 0.8 and approaching the values of the rigid glass substrate alone.

Evaluation of Samples for Durability

In addition, samples including the low emissivity coating layer applied to the glass substrate, and samples including both the low emissivity coating layer and the high emissivity coating layer, were also evaluated for mechanical brush test durability using the Scrub Resistance of Wall Paints test method provided in ASTM D2486-17.

In ASTM D2486-17, coated substrates were initially visually evaluated for surface defects, and if no surface defects were observed the testing was allowed to proceed. A linear abrasion testing device, in which a nylon bristle brush has been attached in a stainless steel brush holder, and wherein 177 grams of weight is added to the linear abrasion testing device to make the total weight 454 grams (roughly 16 ounces, or one pound), was used for the test. The linear abrasion testing device was placed onto the outer surface of the coated substrate and moved in a back and forth manner, having a predefined stroke length of about 20 inches (about 50 centimeters), utilizing a brush having bristles of about 3.5 inches (about 9 centimeters) in length along the outer surface of the coated substrate. One test cycle corresponds to the movement of the testing device for one stroke, which consists of one backward and forward movement of the linear abrasion testing device along the substrate. The testing device was removed at 50 and 150 test cycles, and the coated substrate was visually evaluated for surface defects. The coated substrate was deemed to have an acceptable mechanical brush durability resistance when there was no damage to outer surface layer of the coated substrate by visual observation. Conversely, the coated substrate was deemed to have an unacceptable mechanical brush durability resistance when there was damage to the outer surface layer of the coated substrate in visual observation.

In this example, as noted above, rigid glass panels having the low emissivity coating only, and those having both the low and high emissivity coatings, were evaluated in accordance with the procedure described above. The results are provided in Table 2:

TABLE 2

| Sample | Brush Durability Results Using ASTM D2486-17 (Visual Observation) |
| --- | --- |
| Glass/Low E coating | Coating damage after 50 test cycles (visual observation) |
| Glass/Low E/High E coating | No coating damage after 150 cycles (visual observation) |

The results shown in Table 2 confirm that test samples having both the low and high emissivity coating layers had vastly improved mechanical brush test durability as compared with test samples including only the low emissivity coating layer.

Further Evaluation of Samples for Cooling Capabilities

Samples of the glass substrate alone, samples having the low emissivity coating layer disposed on the glass substrate, and samples having both the low and high emissivity layers disposed on the glass substrate were also evaluated for cooling capabilities.

Figure 4:
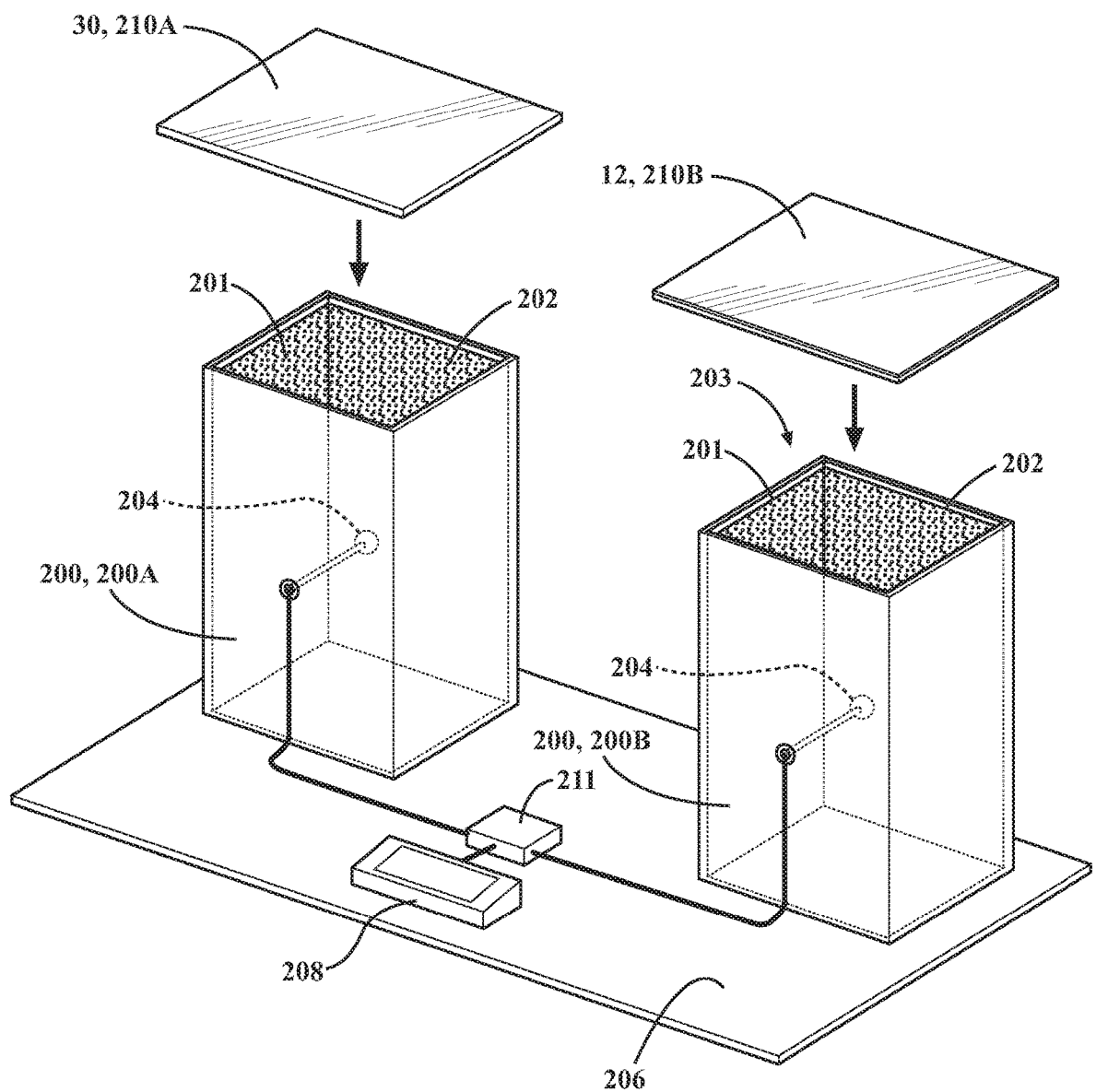
FIG. 4 is a perspective view of a test setup for evaluating the untreated and treated substrates for cooling capabilities within a testing box.

To evaluate the samples, as shown in FIG. 4, two identical wood boxes 200 were formed of plywood (12 inch by 12 inch by 24 inch), with each of the boxes having an open top 201 and including a black fiber cover 202 placed on the interior walls within the interior 203 of the box 200. A thermocouple 204 was positioned within each of the boxes 200 at 5 millimeters from the open top 201 to measure the air temperature within the interior 203 of the box 200.

The two boxes 200 were each placed onto a pallet 206 and spaced far enough apart to negate any node shade effect. The pallet 206 was placed outside in order to simulate real world environmental conditions. A thermocouple 208 was coupled to the pallet 206 to measure the external reference air temperature for each experiment. The thermocouples 204, 208 were each electrically coupled to a controller 211, which recorded the measured air temperatures received from the thermocouples 204, 208.

12 inch by 12 inch test samples of the glass substrate 30, with or without the low and high emissivity layers 32, 34, were positioned along the top surface 201 of a respective one of the boxes 200. More specifically, a reference test sample 210A (i.e., the uncoated glass substrate 30) was placed onto the open top 201 of a first one 200A of the two boxes, while test samples of various treated substrates 210B (i.e., a treated sample 12 having the low emissivity coating layer 32 disposed on the glass substrate 30 or a sample having both the low and high emissivity layer 32, 34 disposed on the glass substrate 30) was placed onto the open top 201 of a second one 200B of the two boxes. The testing of each of the samples 210A, 210B occurred for three hours (from 12 pm to 3 pm EST), with temperature measurements for the interior region of the boxes 200A, 200B continuously measured by the respective thermocouples 204, and temperature measurements from the pallet 206 continuously measured by the thermocouple 208, with the results recorded onto the controller 211.

Figure 5:
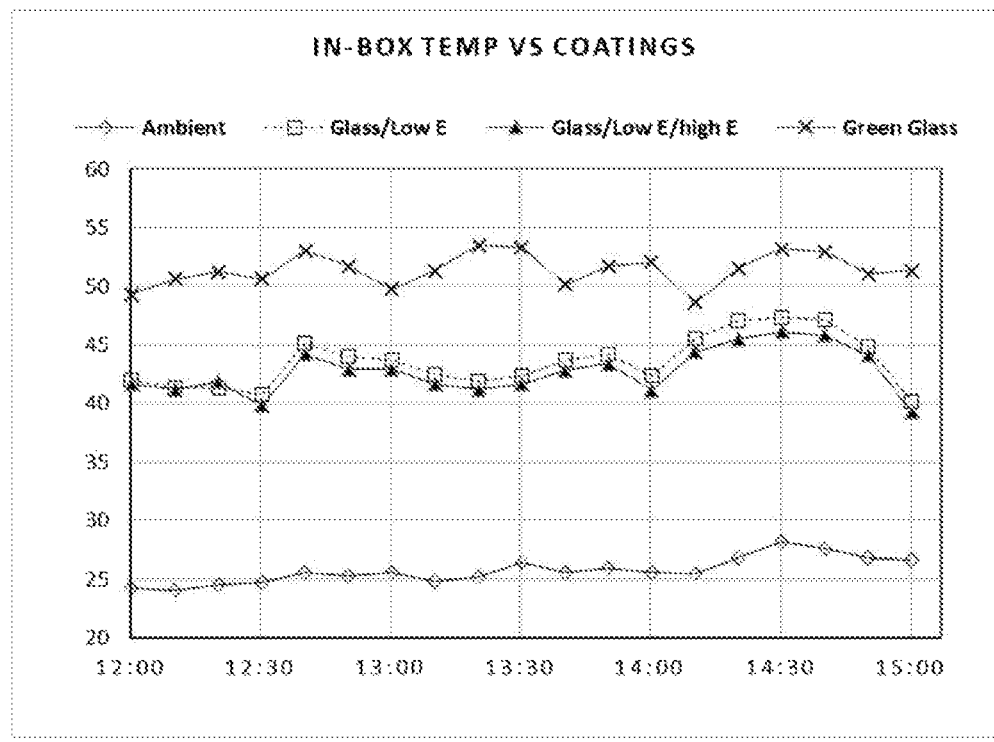
FIG. 5 is a graph plotting temperatures inside and outside the test wooden box with various substrates over a three hour time period.

The results of the testing are shown in graphical form FIG. 5, and illustrate that the introduction of the low emissivity layer alone, or a combination of the low emissivity layer and high emissivity layer on the rigid panel, resulted in a decrease in the temperature within the interior of the wooden box as compared with untreated glass samples, with the ambient temperature being generally consistent through the testing between 25 and 30 degrees Celsius and with the decrease in temperature being generally about 5-10 degrees Celsius cooler. Moreover, the results also illustrate that test samples including both the high emissivity layer and the low emissivity layer disposed on the rigid glass panel resulted in a slight further decrease in temperature within the wooden box as compared with samples including the low emissivity layer alone.

The invention has been described in an illustrative manner, and it is to be understood that the terminology which has been used is intended to be in the nature of words of description rather than of limitation. As is now apparent to those skilled in the art, many modifications and variations of the subject invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A treated substrate comprising:
a substrate;
a low emissivity coating layer disposed on said substrate, said low emissivity coating layer formed from a low emissivity coating composition; and
a high emissivity coating layer disposed on said low emissivity coating layer such that said low emissivity coating layer is between said high emissivity coating layer and said substrate, said high emissivity coating layer formed from a high emissivity coating composition comprising a carbon-doped silicon oxide according to the formula $Si_xO_yC_z$,
wherein x, y and z represent weight percent fractions of silicon, oxygen and carbon atoms in said high emissivity coating composition, and
wherein x ranges from 10 to 80 weight percent, y ranges from 20 to 90 weight percent, and z ranges from 2 to 50 weight percent, and wherein the sum of x+y+z is 100 weight percent,
wherein said high emissivity coating layer has a thickness ranging from 3 to 50 micrometers,
wherein said treated substrate has an emissivity of from greater than 0 to 0.3 at wavelengths below 6 micrometers and an emissivity of from 0.7 to less than 1.0 at wavelengths ranging from 8 micrometers to 13 micrometers.

2. The treated substrate of claim 1, wherein said substrate comprises a glass panel having a first surface and an opposing second surface, and wherein said low emissivity coating layer is disposed between said first surface and said high emissivity coating layer.

3. The treated substrate of claim 1, wherein said substrate comprises a laminated glass assembly comprising:
a first transparent sheet having an inwardly facing surface and an opposing outwardly facing surface;
a second transparent sheet having an inwardly facing surface and an opposing outwardly facing surface; and
an interlayer of polymer disposed between said inwardly facing surfaces of each of said first and second transparent sheet,
wherein said low emissivity coating layer is disposed on one of said inwardly facing surface or said outwardly facing surface of said first transparent sheet.

4. The treated substrate of claim 3, wherein said low emissivity coating layer is disposed on said inwardly facing surface of said first transparent sheet and said high emissivity coating layer is between said low emissivity coating layer and said interlayer.

5. The treated substrate of claim 3, wherein said low emissivity coating layer is disposed on said outwardly facing surface of said first transparent sheet such that said low emissivity coating layer is between said high emissivity coating layer and said first transparent sheet.

6. The treated substrate of claim 1 having a visually acceptable mechanical brush durability resistance for at least 150 test cycles tested in accordance with ASTM D2486-17.

7. The treated substrate of claim 1, wherein said treated substrate has an emissivity of from 0.8 to less than 1.0 at wavelengths ranging from 8 micrometers to 13 micrometers and an emissivity between 0 and 0.1 at wavelengths below 6 micrometers.

8. The treated substrate of claim 1, wherein said low emissivity coating layer has a thickness ranging from 0.05 to 0.5 micrometers.

9. The treated substrate of claim 1, wherein said low emissivity coating composition comprises a transparent conductive coating composition including silver oxide, indium tungsten oxide, or fluorine-doped tin oxide.

10. A system comprising:
a structure defining an interior region and an opening; and
said treated substrate according to claim 1, disposed within said opening for removing heat from said interior region of said structure when light is transmitted through said treated substrate in a direction towards said interior region.

11. The system of claim 10, wherein said substrate comprises a glass panel, and wherein said treated substrate is positioned within said opening such that said high emissivity layer is adjacent said interior region and such that said high emissivity layer is disposed between said interior region and said low emissivity layer.

12. The system of claim 10, wherein said substrate comprises a glass panel having a first surface and an opposing second surface, and wherein said treated substrate is positioned within said opening such that said second surface is adjacent said interior region and such that said glass panel is disposed between said interior region and said low emissivity coating layer.

13. The system of claim 10, wherein said substrate comprises a laminated glass assembly comprising:
    a first transparent sheet having an inwardly facing surface and an opposing outwardly facing surface;
    a second transparent sheet having an inwardly facing surface and an opposing outwardly facing surface; and
    an interlayer of polymer disposed between said inwardly facing surfaces of each of said first and second transparent sheet,
and wherein said treated substrate is positioned within said opening such that said first transparent sheet is between said interior region and said second transparent sheet.

14. The system of claim 10, wherein said substrate comprises a laminated glass assembly comprising:
    a first transparent sheet having an inwardly facing surface and an opposing outwardly facing surface;
    a second transparent sheet having an inwardly facing surface and an opposing outwardly facing surface; and
    an interlayer of polymer disposed between said inwardly facing surfaces of each of said first and second transparent sheet,
and wherein said treated substrate is positioned within said opening such that said second transparent sheet is between said interior region and said first transparent sheet.

15. A method for producing a treated substrate comprising:
    applying a low emissivity coating composition onto a substrate to form a low emissivity coating layer; and
    applying a high emissivity coating composition onto the formed low emissivity coating layer to form a high emissivity coating layer, the high emissivity coating composition comprising a carbon-doped silicon oxide according to the formula $Si_xO_yC_z$,
    wherein x, y and z represent weight percent fractions of silicon, oxygen and carbon atoms in the high emissivity coating composition, and
    wherein x ranges from 10 to 80 weight percent, y ranges from 20 to 90 weight percent, and z ranges from 2 to 50 weight percent, and wherein the sum of x+y+z is 100 weight percent,
    wherein the high emissivity coating layer has a thickness ranging from 3 to 50 micrometers,
    wherein said treated substrate has an emissivity of from greater than 0 to 0.3 at wavelengths below 6 micrometers and an emissivity of from 0.7 to less than 1.0 at wavelengths ranging from 8 micrometers to 13 micrometers.

16. The method of claim 15, wherein the substrate comprises a glass panel having a first surface and an opposing second surface, and wherein the applied low emissivity coating composition is disposed between the first surface and the applied high emissivity coating layer.

17. The method of claim 16, wherein said step of applying a low emissivity coating composition comprises:
    sputtering a low emissivity coating composition onto at least a part of a surface of a substrate to form a low emissivity coating layer, the low emissivity coating composition comprising a transparent conductive coating composition including silver oxide, indium tungsten oxide, or fluorine-doped tin oxide.

18. The method of claim 15, wherein the substrate comprises a first transparent sheet having an inwardly facing surface and an opposing outwardly facing surface, and wherein said steps of applying a low emissivity coating composition and applying a high emissivity coating composition comprise:
    applying the low emissivity coating composition onto a single one of the inwardly facing surface or the outwardly facing surface of the first transparent sheet to form the low emissivity coating layer disposed on the first transparent sheet; and
    applying the high emissivity coating composition onto the formed low emissivity coating layer to form the high emissivity coating layer, the high emissivity coating composition comprising a carbon-doped silicon oxide according to the formula $Si_xO_yC_z$,
    wherein x, y and z represent weight percent fractions of silicon, oxygen and carbon atoms in the high emissivity coating composition, and
    wherein x ranges from 10 to 80 weight percent, y ranges from 20 to 90 weight percent, and z ranges from 2 to 50 weight percent, and wherein the sum of x+y+z is 100 weight percent;
    and wherein said method further comprises:
    providing a second transparent sheet having an inwardly facing surface and an opposing outwardly facing surface;
    providing an interlayer; and
    coupling the interlayer of polymer between the first and second transparent sheets such that the inwardly facing surface of the first transparent sheet is located between the outwardly facing surface of the first transparent sheet and the interlayer of polymer and such that the inwardly facing surface of the second transparent sheet is located between the outwardly facing surface of the second transparent sheet and the interlayer of polymer.

19. The method of claim 18, wherein said step of applying a low emissivity coating composition comprises:
    sputtering a low emissivity coating composition onto a single one of the inwardly facing surface or the outwardly facing surface of the provided first transparent sheet to form a low emissivity coating layer disposed on the first transparent layer.

20. The method of claim 15, wherein the formed low emissivity coating layer has a thickness ranging from 0.05 to 0.5 micrometers.

21. The method of claim 15, wherein said step of applying a high emissivity coating composition onto the formed low emissivity coating layer comprises:
    applying a high emissivity coating composition by plasma-enhanced chemical vapor deposition onto the formed low emissivity coating layer to form a high emissivity coating layer.

22. A treated substrate produced according to the method of claim 15.

23. The treated substrate of claim 22,
    wherein said produced treated substrate has an emissivity of from greater than 0 to 0.3 at wavelengths below 6 micrometers and also has an emissivity of from 0.7 to less than 1.0 at wavelengths ranging from 8 micrometers to 13 micrometers, and wherein said produced treated substrate has a visually acceptable mechanical brush durability resistance for at least 150 test cycles tested in accordance with ASTM D2486-17.

* * * * *